(12) United States Patent
Schweiger

(10) Patent No.: US 8,789,831 B2
(45) Date of Patent: *Jul. 29, 2014

(54) COMPRESSION LIMITER WITH MOLDED INSERT FOR GASKETS

(75) Inventor: David J. Schweiger, Pewaukee, WI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 252 days.

This patent is subject to a terminal disclaimer.

(21) Appl. No.: 12/925,736

(22) Filed: Oct. 28, 2010

(65) Prior Publication Data

US 2011/0101624 A1    May 5, 2011

Related U.S. Application Data

(60) Provisional application No. 61/280,054, filed on Oct. 29, 2009.

(51) Int. Cl.
*F02F 11/00* (2006.01)

(52) U.S. Cl.
USPC ............... 277/598; 277/592; 277/596

(58) Field of Classification Search
USPC .......................... 277/592, 594, 596
See application file for complete search history.

(56) References Cited

U.S. PATENT DOCUMENTS

| | | | |
|---|---|---|---|
| 3,195,906 A | 7/1965 | Moyers | |
| 3,531,133 A | 9/1970 | Sheesley | |
| 3,874,675 A | 4/1975 | Belter | |
| 4,312,512 A * | 1/1982 | Conte et al. | 277/593 |
| 4,535,999 A * | 8/1985 | Locacius | 277/596 |
| 4,743,421 A * | 5/1988 | McDowell et al. | 264/129 |
| 5,145,190 A * | 9/1992 | Boardman | 277/596 |
| 5,540,452 A | 7/1996 | Belter | |
| 5,639,103 A * | 6/1997 | Jeanne et al. | 277/596 |
| 5,671,927 A | 9/1997 | Schweiger | |
| 5,803,465 A | 9/1998 | Schweiger | |
| 6,609,717 B2 * | 8/2003 | Hinson | 277/598 |
| 6,866,026 B2 * | 3/2005 | Mickelson | 123/470 |
| 7,147,231 B2 * | 12/2006 | Koch | 277/592 |
| 7,475,882 B2 * | 1/2009 | Antonini et al. | 277/596 |
| 7,681,890 B2 * | 3/2010 | Griffin et al. | 277/592 |
| 7,744,095 B2 * | 6/2010 | Matsuki et al. | 277/596 |
| 7,806,413 B2 * | 10/2010 | Hurlbert et al. | 277/592 |
| 7,866,670 B2 * | 1/2011 | Dhole et al. | 277/592 |

(Continued)

FOREIGN PATENT DOCUMENTS

| | | |
|---|---|---|
| DE | 3344734 | 6/1985 |
| DE | 3719189 | 12/1988 |

(Continued)

*Primary Examiner* — Vishal Patel
*Assistant Examiner* — Eugene G Byrd
(74) *Attorney, Agent, or Firm* — Marshall & Marshall, LLC

(57) ABSTRACT

The present invention is directed to an insert for a cylinder head gasket for an internal combustion engine. The cylinder head gasket may be made from metal, a composite material, or a combination of the two, and is disposed between a cylinder head and a cylinder block. The insert has an outer plate having upper and lower surfaces, an outer perimeter and a closed inner perimeter. A removable molded insert is located within the closed inner perimeter of the outer plate. The removable molded insert has a bead portion and an inner land portion. A metallic carrier is substantially enclosed within the bead portion and planar portion of the removable molded insert. The removable molded insert may be attached to the outer plate by mechanical or chemical means. The insert may be attached to a cylinder head gasket by mechanical means.

13 Claims, 3 Drawing Sheets

(56) References Cited

U.S. PATENT DOCUMENTS

| | | | |
|---|---|---|---|
| 2005/0127615 A1* | 6/2005 | Matsuki et al. | 277/592 |
| 2011/0101625 A1* | 5/2011 | Schweiger | 277/592 |

FOREIGN PATENT DOCUMENTS

| | | |
|---|---|---|
| DE | 3720838 | 1/1989 |
| EP | 333920 | 9/1989 |
| EP | 417495 | 3/1991 |
| EP | 505693 | 9/1992 |
| GB | 2163496 | 2/1986 |
| JP | 50-128506 | 10/1975 |
| JP | 51-85155 | 7/1976 |
| JP | 51-101460 | 8/1976 |
| JP | 54-148748 | 10/1979 |

\* cited by examiner

COMPRESSION LIMITER WITH MOLDED INSERT FOR GASKETS

CROSS-REFERENCE TO RELATED APPLICATIONS

This application is a non-provisional application filed off of U.S. patent application Ser. No. 61/280,054 filed on Oct. 29, 2009, which is incorporated by reference in its entirety herein. This non-provisional application is being filed during the pendency of U.S. patent application Ser. No. 61/280,054.

FIELD OF THE INVENTION

The present invention relates to an insert with an outer plate and a removable molded insert for a gasket, such as a cylinder head gasket for use in internal combustion engines.

BACKGROUND OF THE INVENTION

Gaskets essentially are used to seal and prevent leakage between two parts. Cylinder head gaskets for internal combustion engines seal the gap between the cylinder head and the cylinder block. Sealing the gap, however, can be difficult because the head, block and gasket all move due to pressure and temperature fluctuations, which results in the gasket being subjected to constant pressure changes. There are also problems due to thermal expansion and thermal contraction, which occurs when the temperatures varies in the cylinder head base. There are also multiple openings in the head and the block for cylinder bores, fluid holes and bolts holes, to name a few. The areas around these openings are known to be put under additional stresses and leakage is common.

Traditionally, a molded rubber insert is used to address gasket leakage in the areas around fluid openings. The molded rubber insert is typically made solely from an elastomeric material, which has little or no structural integrity. Due to thermal motion, resulting from hot exhaust gases, increasing combustion pressure and steep thermal swings, sheer stresses are created in this area and the molded rubber insert can tear or become over compressed and does not adequately stop the leakage. Additionally, the attack of fluids, such as coolant, water and oil, on the molded rubber insert reduces its effectiveness to set compression and also make the molded rubber inserts more susceptible to wear. Ultimately, the molded rubber insert loses its recovery potential.

There are also difficulties in attaching molded rubber inserts to a parent gasket. Difficulty exists because the attachment methods are typically manual resulting in excessive time and being subject to human error.

In view of the foregoing disadvantages of the prior art it would be advantageous for a gasket to be able to prevent or resist thermal motion to the extent that it negatively affects performance of the gasket. More specifically, it would be advantageous for a gasket to eliminate or prevent compression set and stress relaxation often seen in the prior art. It would also be advantageous for the insert to be easily attachable to a parent gasket.

SUMMARY OF THE INVENTION

The present invention is directed to an insert for a cylinder head gasket for an internal combustion engine. The cylinder head gasket may be made from metal, a composite material, or a combination of the two, and is disposed between a cylinder head and a cylinder block.

The insert is located around a fluid aperture, which may include coolant and/or oil passage openings. The insert has an outer plate having upper and lower surfaces, an outer perimeter and a closed inner perimeter. A removable molded insert is located within the closed inner perimeter of the outer plate. The removable molded insert has a bead portion and an inner land portion. A metallic carrier is substantially enclosed within the bead portion and the inner land portion of the removable molded insert.

The removable molded insert may be attached to the outer plate by mechanical or chemical means. The insert may be attached to a cylinder head gasket by mechanical means.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
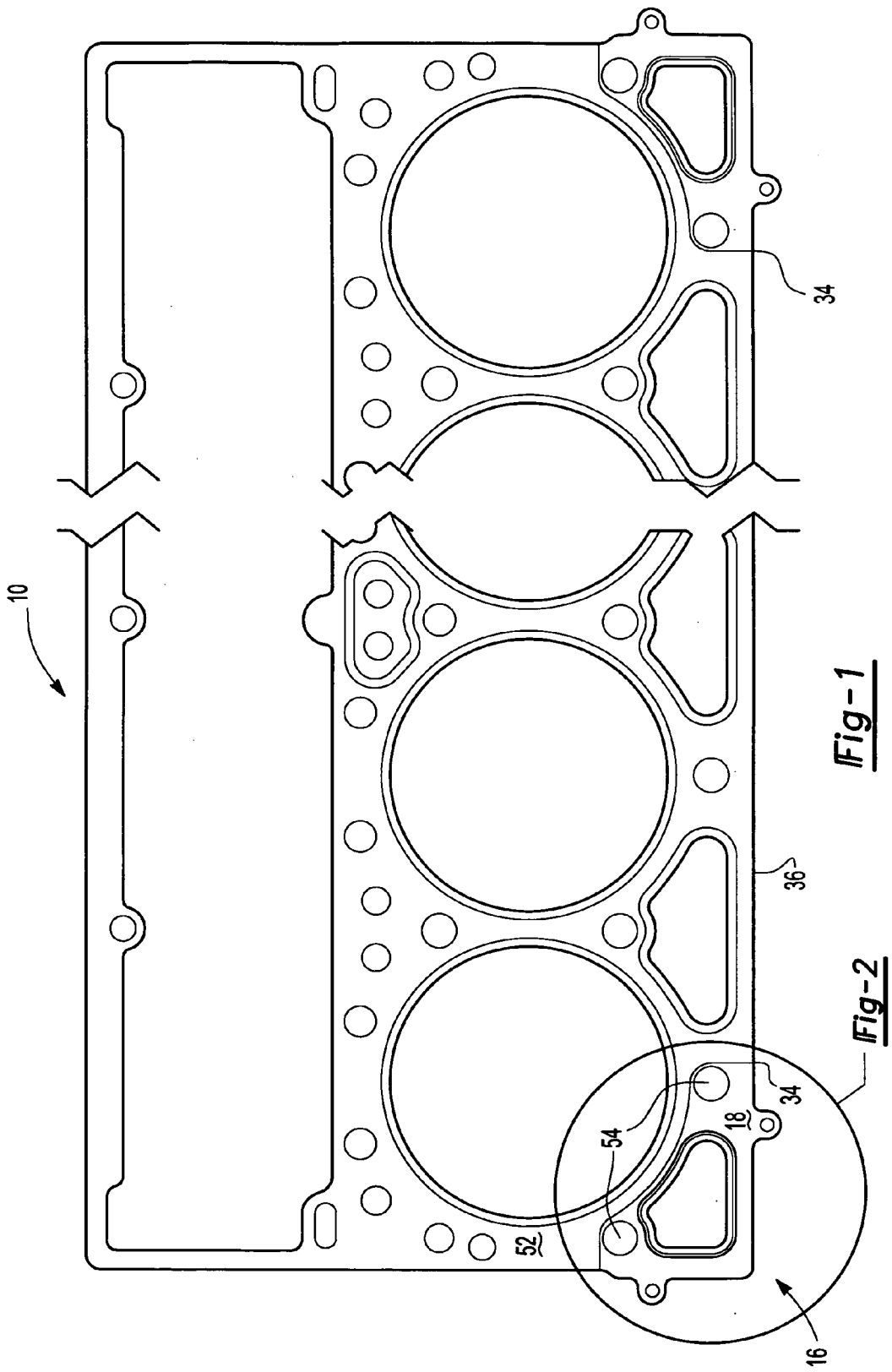
FIG. 1 is a top view of one embodiment of a cylinder head gasket.
Figure 4:
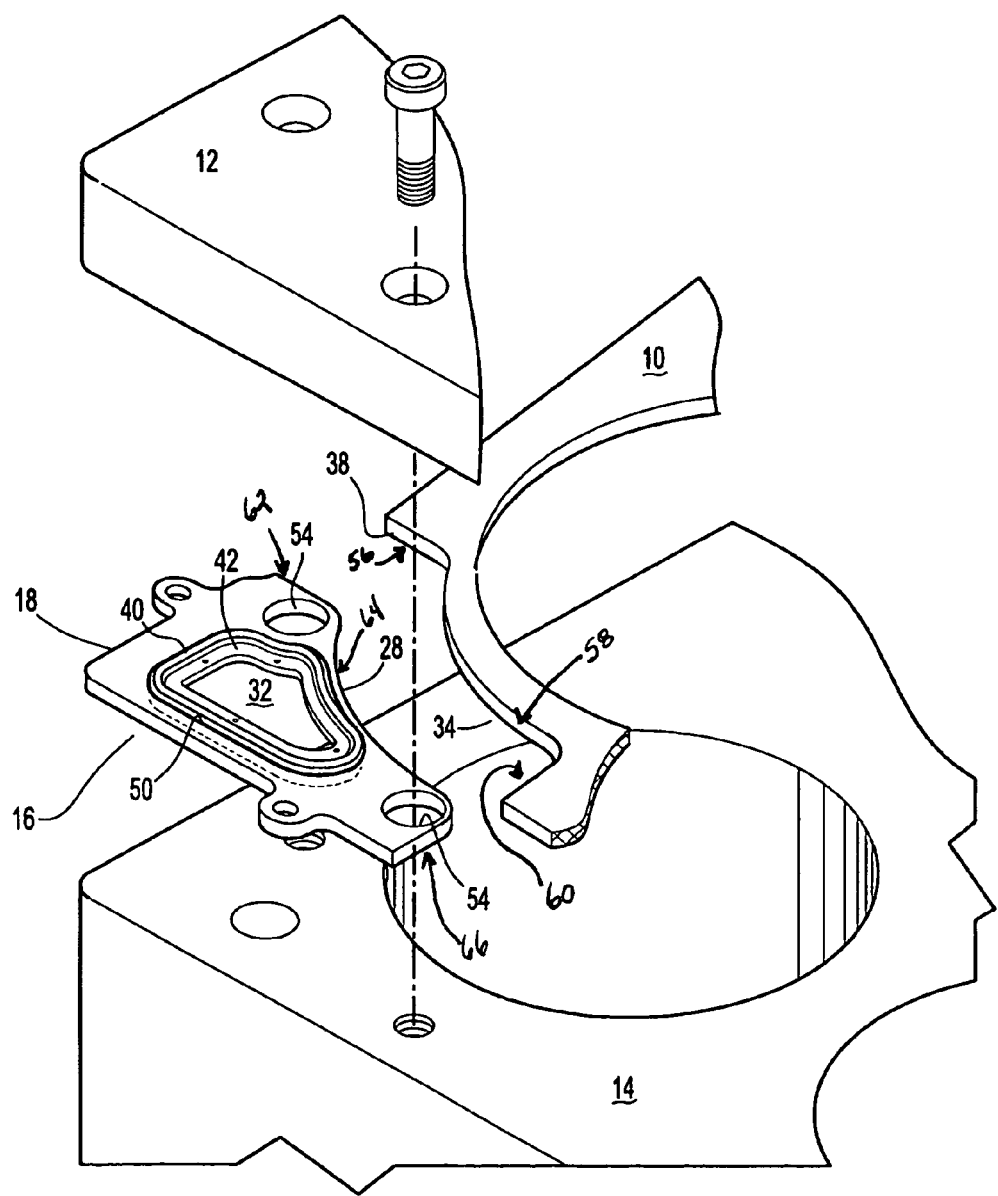
FIG. 4 is a partial perspective exploded view of the present invention with a cylinder head, a cylinder block, an insert and a cylinder head gasket.

Turning now to FIG. 1, one embodiment of a cylinder head gasket 10 is depicted. The cylinder head gasket 10 is situated between a cylinder head 12 and a cylinder block 14, as depicted in FIG. 4. The cylinder head gasket 10 may be made from metal, a composite material, or a combination of the two. Cylinder head gaskets are manufactured in accordance with the various shapes of engine blocks and heads, and include numerous openings, such as fluid openings for coolant and oil, bolt holes and openings for cylinder bores. Various sealing means are created for sealing around the respective openings.

Figure 2:
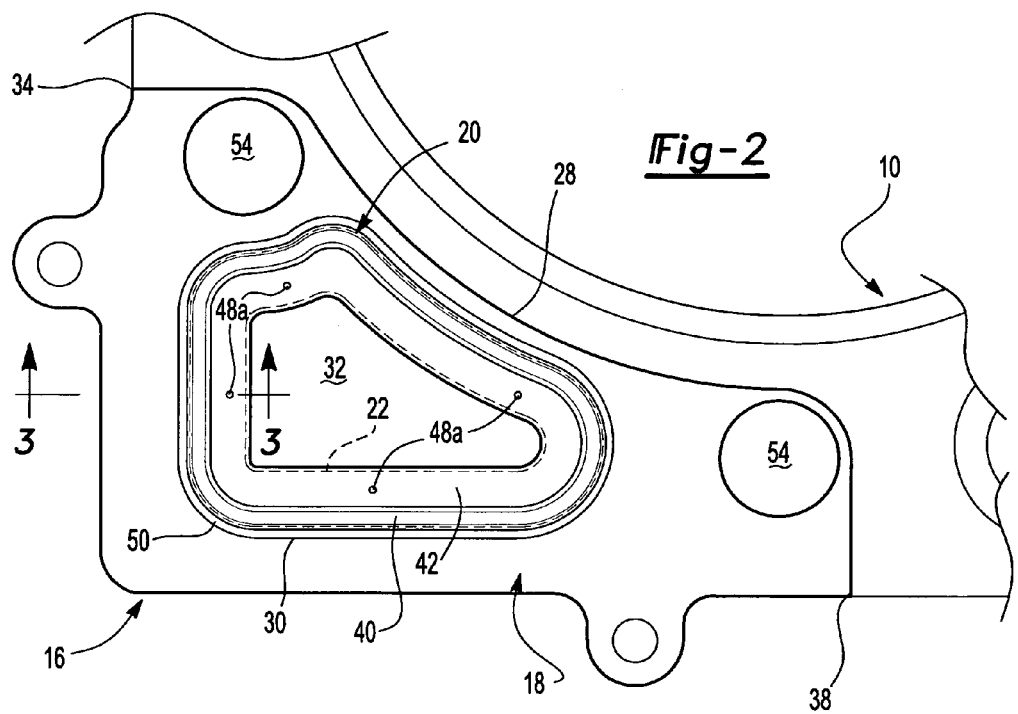
FIG. 2 is a top view of a portion of the gasket of FIG. 1.

The cylinder head gasket 10 includes an insert 16, as shown in FIGS. 1 and 2. The insert 16 comprises an outer plate 18, a removable molded insert 20 and a metallic carrier 22. The outer plate 18 acts as a compression limiter. The use of a compression limiter with a removable molded insert eliminates over-compression, which thereby reduces the degree of compression set typically associated with a molded rubber insert alone. These features are reduced in a molded rubber insert due to the exposure to high temperatures and the attack of fluids on the rubber, and such conditions over time work to break down the molded rubber composition. Due to the addition of the outer plate 18 with the removable molded insert 20 recovery potential is maintained.

As depicted in the embodiments of FIGS. 1 and 4, the cylinder head gasket 10 comprises a cut-out area 34 in at least one corner. As shown in FIG. 1, at least one corner may have a cut-out area 34, although additional or fewer corners may have a cut-out area 34.

The insert 16 is positioned within the cut-out area 34 and may be fastened to the cylinder head gasket 10 by mechanical or chemical means, such as by tabs or by an adhesive. The insert 16 may also be placed into position next to the cylinder head gasket 10 during assembly of the cylinder head 12 and the cylinder block 14, without being fastened to the cylinder head gasket 10. It is also within the scope of the present invention for the insert 16 to be located around a fluid passage opening within the cylinder head gasket body or backland 52, and not just along the gasket outer perimeter 36 or in a corner.

The outer perimeter 28 of the outer plate 18 is complimentary to an outer edge 38 of the cut-out area 34 of the of the cylinder head gasket 10, as shown in FIG. 4. The outer edge 38 of the cut-out area 34 is defined by, in series, a first straight edge portion 56, a curve portion 58, and a second straight edge portion 60. The outer perimeter edge 28 of the outer plate 18 is complimentary in shape and defined by, in series, a first straight edge portion 62, a curve portion 64, and a second straight edge portion 66. The outer plate 18 preferably incorporates at least one fluid passage opening 32. The at least one opening 32 may include coolant and/or oil passage openings.

The outer plate 18 is a single layer comprising an upper surface 24, a lower surface 26, an outer perimeter 28 and an inner closed perimeter 30 defining a fluid aperture 32. The upper and lower surfaces 24, 26 are planar and parallel. It is also within the scope of the present invention for the outer plate 18 to be comprised of multiple layers. As shown in FIG. 4, the outer plate 18 is substantially the same thickness as the cylinder head gasket 10.

Figure 3:
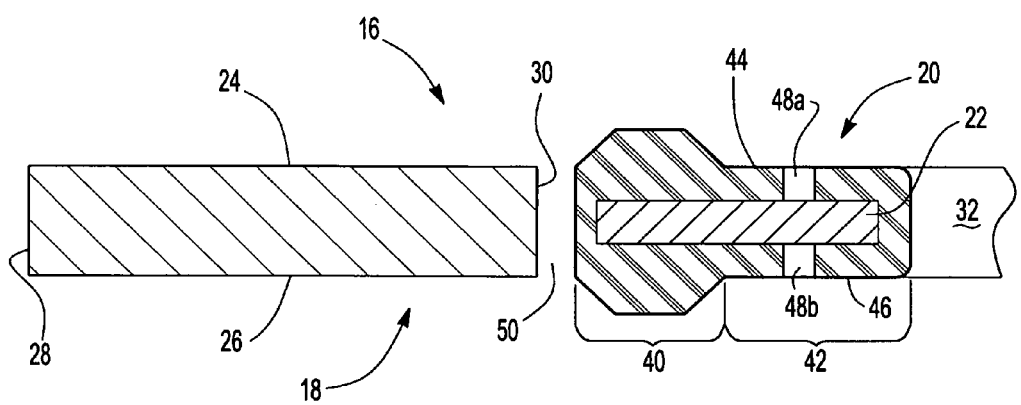
FIG. 3 is a side view of a portion of the present invention along lines 3-3 of FIG. 2.

The removable molded insert 20 is located within and surrounded by the inner closed perimeter 30 of the outer plate 18, as depicted in FIG. 2. The outer perimeter 28 of the outer plate 18 and the removable molded insert 20 have substantially the same shape. The removable molded insert 20 is a compressible sealing member, made of an elastomeric material. The removable molded insert 20 comprises a bead portion 40 and an inner land portion 42, which are continuous. The bead portion 40 is unitary and outboard of the inner land portion 42, and extends above and below the inner land portion 42 equally. The inner land portion 42 comprises upper and lower surfaces 44, 46 which are planar and substantially parallel to the upper and lower surfaces 24, 26 of the outer plate 18, as shown in FIG. 3. It is also within the scope of the invention for the removable molded insert 20 to comprise a bead portion 40 only, allowing a portion of the metallic carrier 22 to not be overmolded with the elastomeric material.

Also as depicted in FIG. 3, the bead portion 40 and a portion of the inner land portion 42 of the removable molded insert 20 directly contacts and substantially surrounds the metallic carrier 22. The bead portion 40 is essentially the sealing area, whereas the inner land portion 42 is molded over the metallic carrier 22 to improve the elastomeric material to steel bond and to protect the bonded area from attack by the fluids being sealed. Additionally there are two small gaps 48a, 48b opposite each other on the inner land portion 42 of the removable molded insert 20 where support pins (not shown) are used in a mold (not shown) to hold the metallic carrier 22 in place so that the removable molded insert 20 can be molded around it. The metallic carrier 22 provides structural integrity and also conformability to the removable molded insert 20.

As depicted in FIG. 2, when the removable molded insert 20 is placed within the outer plate 18, a small continuous, substantially uniform gap 50 is maintained between the bead portion 40 of the removable molded insert 20 and inner closed perimeter 30 of the outer plate 18 to allow for the expansion of the removable molded insert 20 when being compressed.

As shown in FIG. 3, the outer plate 18 is thicker than the metallic carrier 22 and has substantially the same thickness as the inner land portion 42 of the removable molded insert 20. The thickness of the metallic carrier 22 may be equal to or greater than that of the inner land portion 42. The planar surfaces of the outer plate 18 and the metallic carrier 22 are parallel to one another. The outer plate 18 with removable molded insert 20 extends radially outward from the fluid passage aperture 32 and into the backland 52 of the cylinder head gasket 10.

The outer plate 18, as shown FIG. 1, may also encompass bolt holes 54 adjacent the fluid aperture 32. This feature provides metal to metal contact between the cylinder head 12 and the cylinder block 14 at the cylinder head gasket joint. Due to the location of the outer plate 18 of the insert 16, between the cylinder head 12 and the cylinder block 14 relative to the bolt holes 54, there is improved bolt load retention because of the metal to metal contact. Such metal to metal contact is advantageous because of the motion in this area caused by the thermal and/or mechanical movement between the cylinder head 12 and the cylinder block 14.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A gasket assembly, comprising:
   a cylinder head gasket having an upper surface, a lower surface, and an outer perimeter edge, a corner of said cylinder head gasket comprises a cut-out area wherein an outer perimeter edge of said cut-out area is defined by, in series, a first straight edge portion, a curve portion, and a second straight edge portion, and a plurality of apertures for cylinder bores, fluid holes and bolt holes, at least one of said fluid holes for oil or coolant; and
   an insert with an upper surface, a lower surface and an outer perimeter edge, said outer perimeter edge defined by, in series, a first straight edge portion, a curve portion, and a second straight edge portion, abutting and complimentary in shape to a portion of said outer perimeter edge of said cylinder head gasket and said insert upper and lower surfaces being parallel and planar to said upper and lower surfaces of said cylinder head gasket, said insert comprising a compression limiter and a removable molded insert, said compression limiter comprising a curvilinear inner closed perimeter defining an aperture within which said removable molded insert extends entirely around, and a thickness substantially equal to the thickness of said cylinder head gasket, said removable molded insert comprising a bead portion with an uncompressed thickness greater than the compression limiter, said removable molded insert comprising a metallic carrier with a thickness less than the thickness of said compression limiter.

2. A gasket assembly according to claim 1, wherein said removable molded insert is located within and surrounded by said inner closed perimeter of said compression limiter.

3. A gasket assembly according to claim 1, wherein said removable molded insert comprises said bead portion and an inner land portion, said bead portion and said inner land portion are unitary and said bead portion is outboard of said inner land portion.

4. A gasket assembly according to claim 1, wherein said metallic carrier is substantially enclosed within said removable molded insert.

5. A gasket assembly according to claim 1, wherein said compression limiter is unitary.

6. A gasket assembly according to claim 1, wherein a substantially uniform gap is maintained between said bead portion of said removable molded insert and said inner closed perimeter portion of said compression limiter.

7. A gasket assembly according to claim 1, wherein said inner closed perimeter of said compression limiter and said removable molded insert have substantially the same shape.

8. A gasket assembly according to claim 1, wherein said cylinder head gasket is made of a composite material.

9. A gasket assembly according to claim 1, wherein said cylinder head gasket is primarily made of metal.

10. A gasket assembly according to claim 1, wherein said compression limiter is a single layer.

11. A gasket assembly according to claim 1, wherein said compression limiter is comprised of multiple layers.

12. A gasket assembly according to claim 1, wherein said bead portion of said removable molded insert and an inner land portion of said removable molded insert are continuous about said fluid aperture.

13. A gasket assembly, comprising:
   a cylinder head gasket having an upper surface, a lower surface, an outer perimeter edge comprising a cut-out area defined by, in series, a first straight edge portion, a curve portion, and a second straight edge portion, and a plurality of apertures for cylinder bores, fluid holes and bolt holes, at least one of said fluid holes for oil or coolant; and an insert with an upper surface, a lower surface and an outer perimeter edge, said outer perimeter edge defined on one side by, in series, a first straight edge portion, a curve portion, and a second straight edge portion, which is abutting and complimentary to a portion of said outer perimeter edge of said cylinder head gasket and said insert upper and lower surfaces being parallel and planar to said upper and lower surfaces of said cylinder head gasket, said insert comprising a compression limiter and a removable molded insert, said compression limiter comprising a curvilinear inner closed perimeter defining an aperture within which said removable molded insert extends entirely around, and a thickness substantially equal to the thickness of said cylinder head gasket, said removable molded insert comprising a bead portion with an uncompressed thickness greater than the compression limiter, said removable molded insert comprising a metallic carrier with a thickness less than the thickness of said compression limiter.

\* \* \* \* \*